Aug. 26, 1952 J. MARZIANI 2,608,333
EVACUATING AND HEAT-SEALING MACHINE
Filed June 28, 1949 5 Sheets-Sheet 4
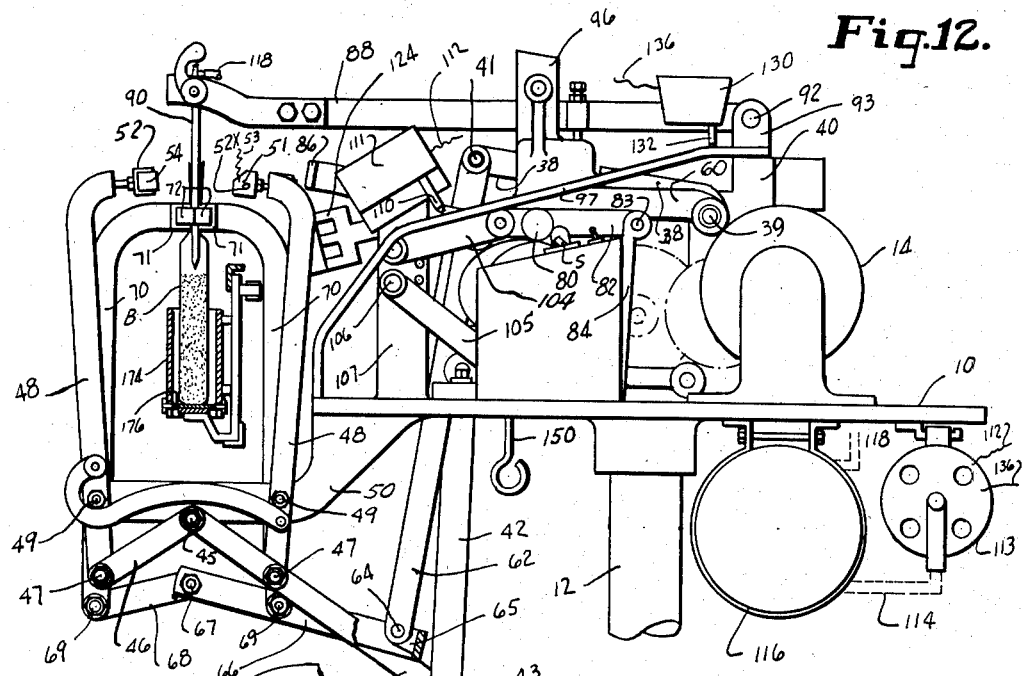
Fig.12.
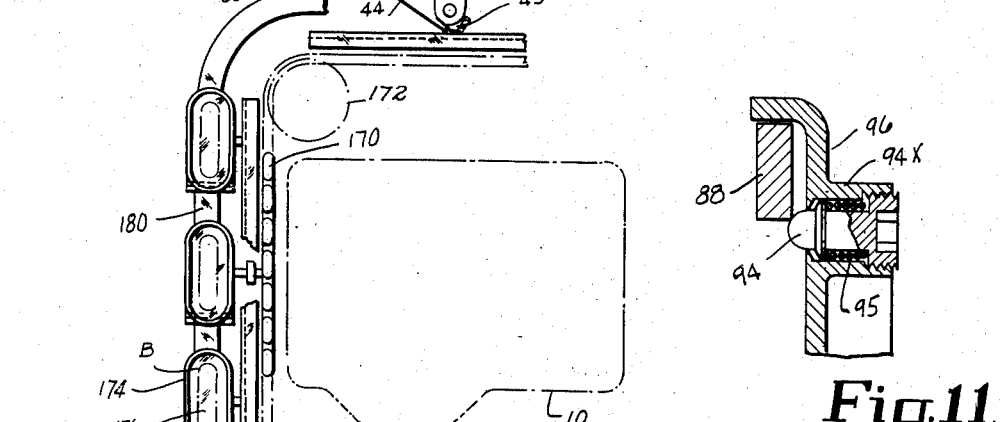
Fig.11.
Fig.13.
Fig.13A.
INVENTOR.
JOSEPH MARZIANI
BY
Louis Nicho
ATTORNEY

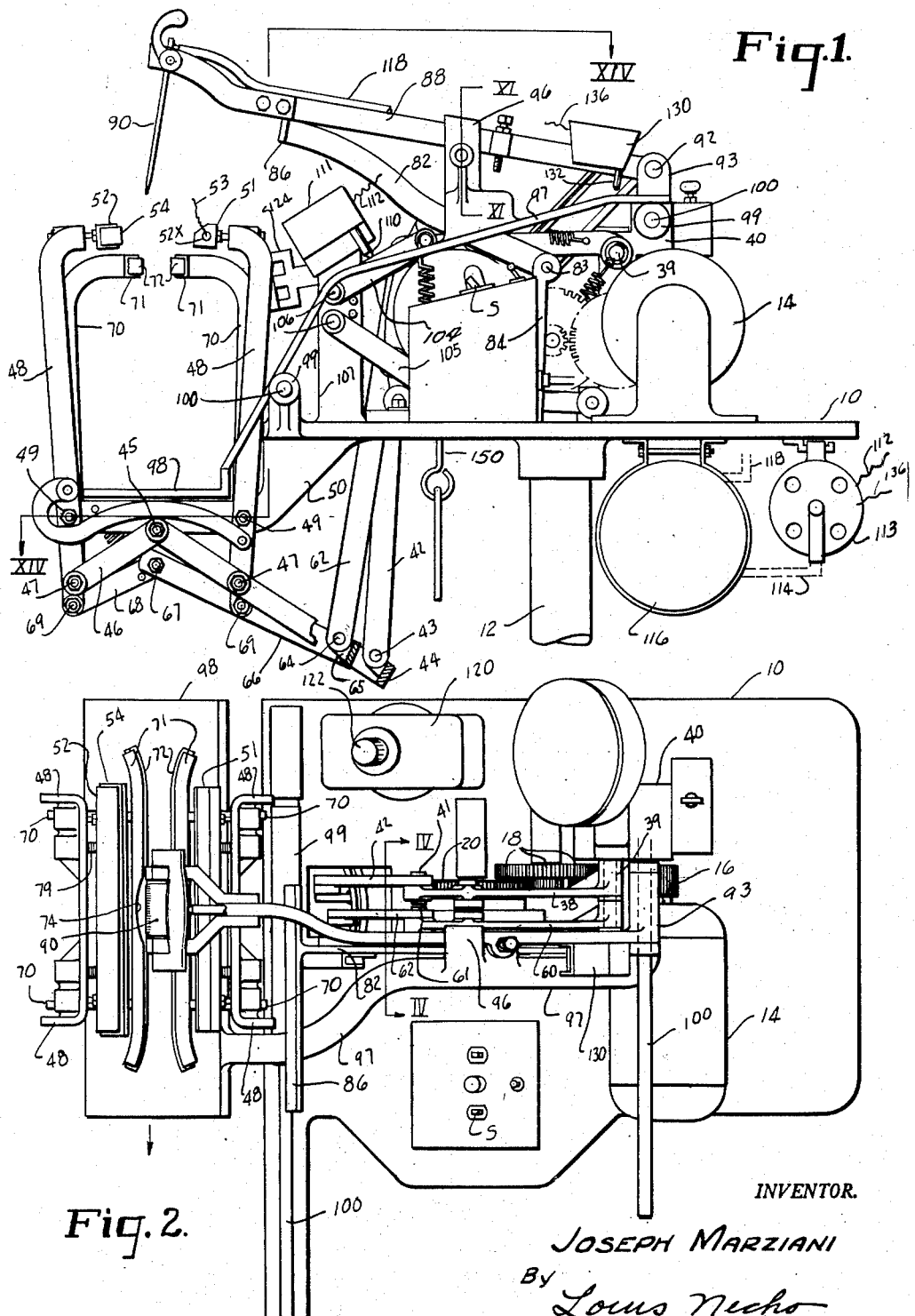

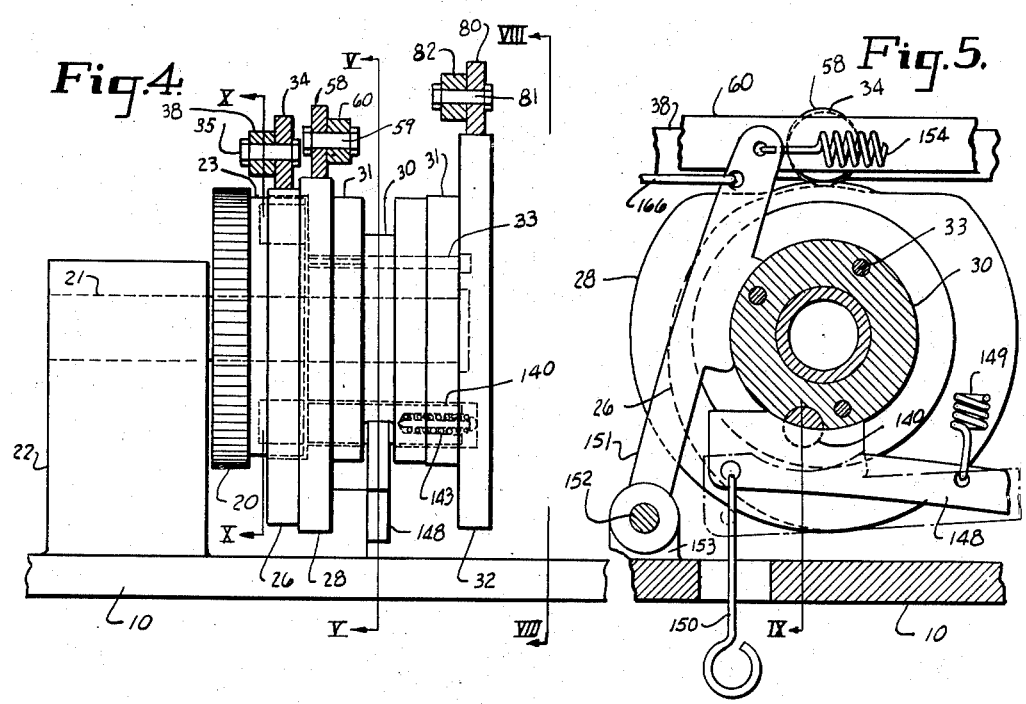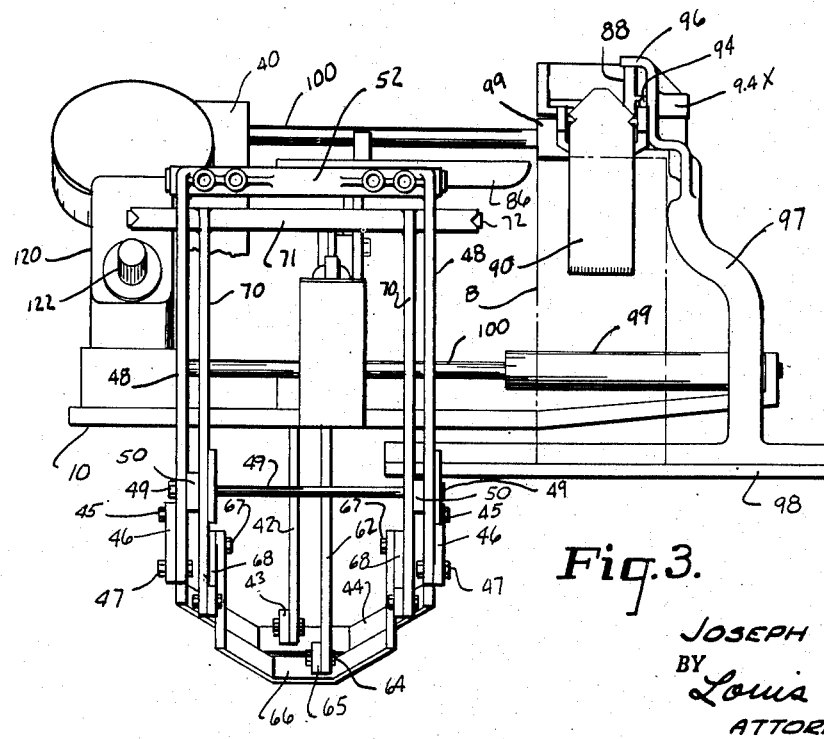

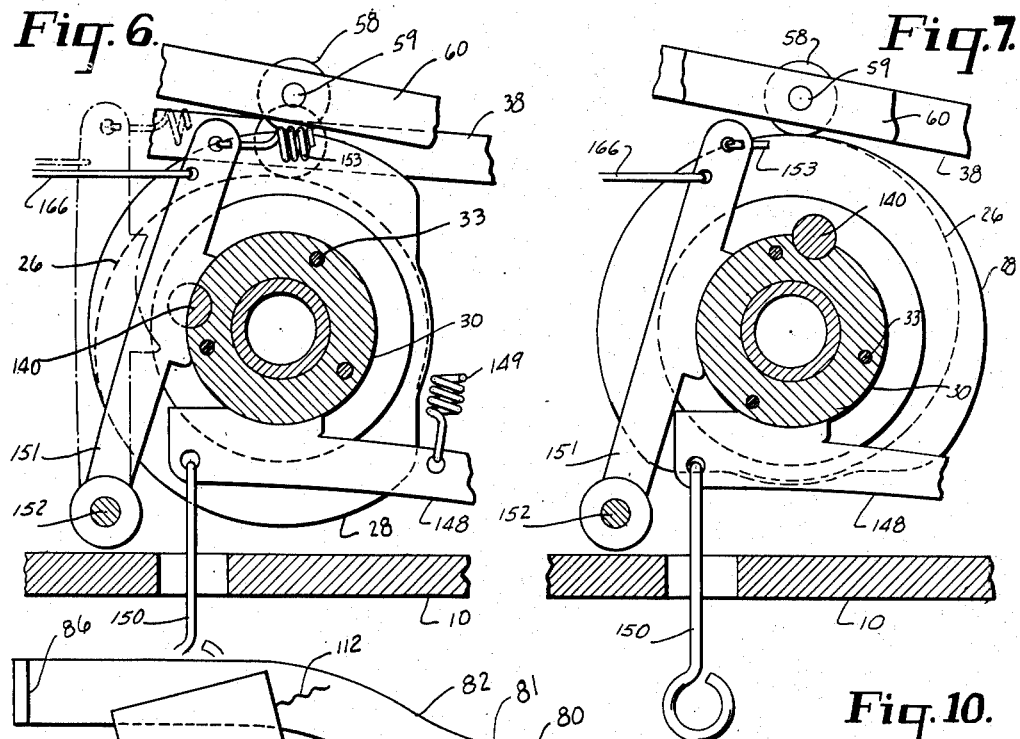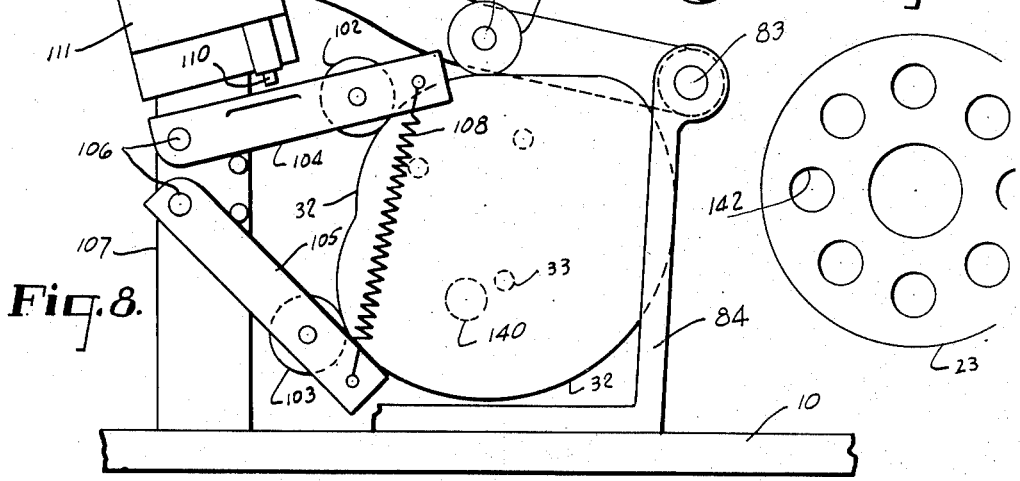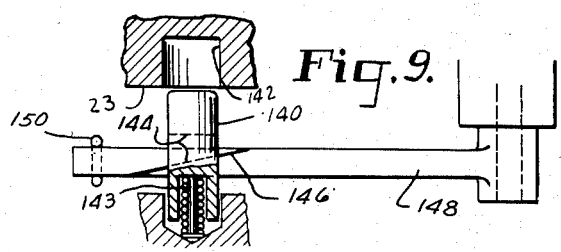

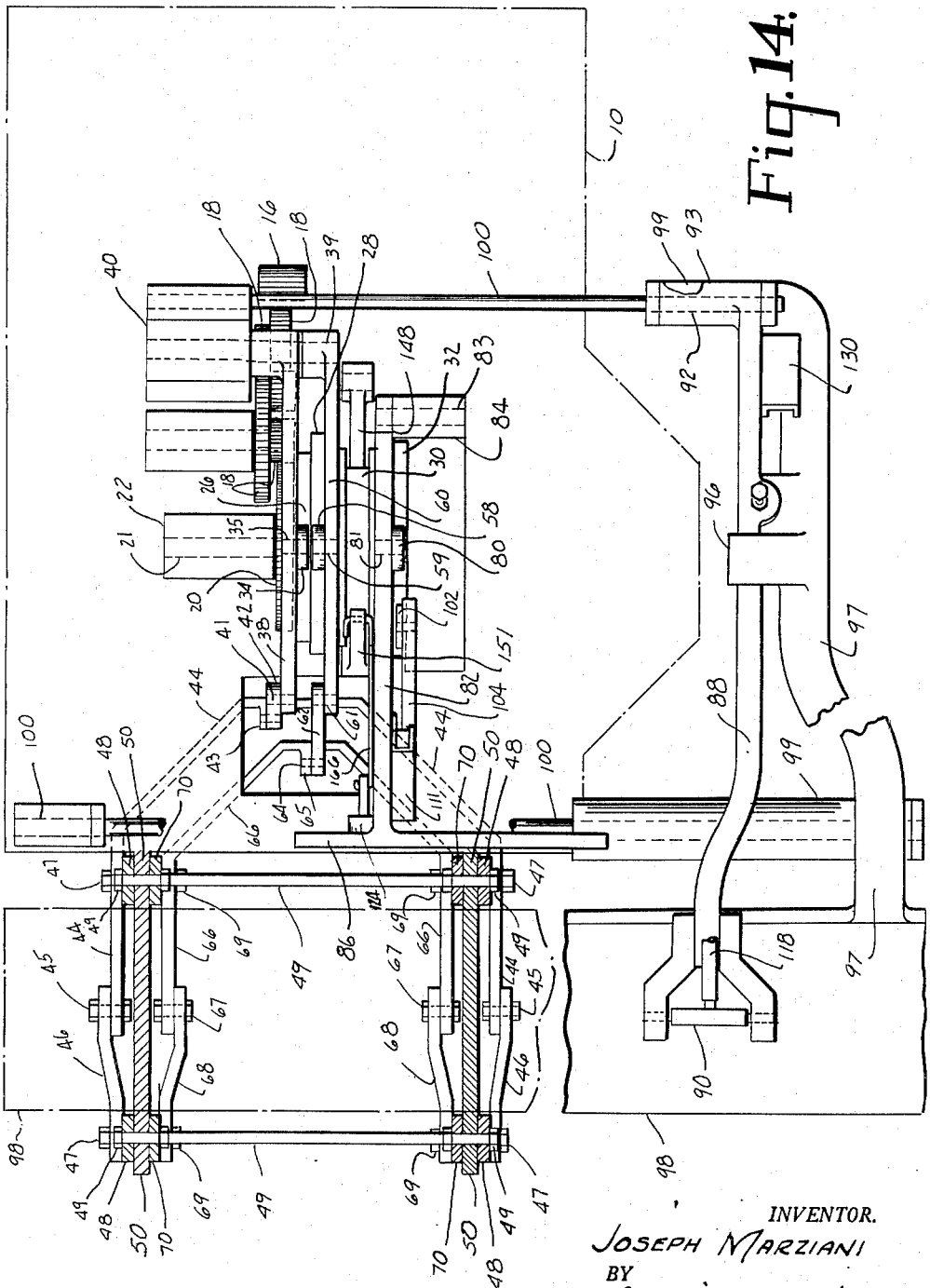

Patented Aug. 26, 1952

2,608,333

UNITED STATES PATENT OFFICE 2,608,333

EVACUATING AND HEAT-SEALING MACHINE

Joseph Marziani, Philadelphia, Pa.

Application June 28, 1949, Serial No. 101,805

7 Claims. (Cl. 226—56)

1

My invention relates to a combined heat sealing and vacuum producing machine whereby bags and other receptacles made of thermoplastic materials may be evacuated and heat-sealed in the order set forth.

The object of the invention is to produce an improved machine of the type set forth.

A further object is to produce an improved heat sealing and vacuum producing machine which is relatively easy and inexpensive to produce and operate.

These, and other, objects are attained by my invention as set forth in the following specification and as illustrated in the accompanying drawings in which:

Fig. 1 is a side elevational view of a heat sealing and vacuum producing machine embodying my invention, the same being shown as it appears when it is not sealing nor producing a vacuum.

Fig. 2 is a top plan view of the same.

Fig. 3 is a partial front elevational view of the same.

Fig. 4 is a sectional view taken on line 4—4 on Fig. 2 showing details of the driving mechanism.

Fig. 5 is a sectional view taken on line 5—5 on Fig. 4.

Fig. 6 is similar to Fig. 5 but shows the driving mechanism after having moved through an angle of 90 degrees.

Fig. 7 is similar to Fig. 5 but shows the driving mechanism after having moved through an angle of 180 degrees.

Fig. 8 is a sectional view taken on line 8—8 on Fig. 4.

Fig. 9 is a sectional view taken on line 9—9 on Fig. 5.

Fig. 10 is a sectional view taken on line 10—10 on Fig. 4.

Fig. 11 is a sectional view taken on line 11—11 on Fig. 1.

Fig. 12 is similar to Fig. 1 but shows the machine as it appears during the vacuum producing operation and shows the addition of a conveyor to the machine of Fig. 1.

Fig. 13 is a fragmentary top plan view of Fig. 12, certain parts being omitted.

Fig. 13A is a fragmentary sectional view showing details of construction.

Fig. 14 is an enlarged view on line 14—14 on Fig. 1 showing details of construction.

As best shown in Figs. 1 and 12, the machine includes a platform 10 mounted on a pedestal 12 and supporting a motor 14 which drives a pinion 16 keyed to the motor shaft. See Fig. 2. The

2 motor 14 is energized or de-energized by a conventional main switch S which is connected to the motor and to a source of energy in the usual way. The pinion 16, through a reduction train 18, drives a gear 20. The gear 20, which is best seen in Fig. 4, is freely rotatable on a shaft 21 which is carried by a bracket 22 mounted on the platform 10. The gear 20 carries, or has integrally formed with it, a clutch 23 which is adapted to engage and rotate a cam assembly consisting of cams 26, 28 and 32 and spacer discs 30 and 31. Of these discs, the spacer disc 30 will be further referred to. The cams 26, 28 and 32 and the spacer discs 30 and 31 are also freely rotatable on the shaft 21 and may be in the nature of separable cams integrated by means of bolts 33, or they may be machined on a single casting. The manner in which the cam and spacer assembly is engaged with, and disengaged from, the clutch 23 will be hereinafter set forth.

Constantly riding on cam 26 is a follower roller 34 which is connected by a pin 35 to link 38 at a point intermediate the ends of said link. The inner, or right hand, end of link 38, as viewed in Figs. 14 and 12, is freely rotatable about a stub shaft 39 which is carried by a bracket 40, also mounted on platform 10. By this arrangement, as the follower roller 34 rides on the high and low portions of cam 26, the link 38 rocks about the shaft 39.

The other end of link 38 is pivoted at 41 to the upper end of a link 42, the lower end of which is pivoted to a lug 43 carried by a curved strap 44 intermediate the ends of said strap. The ends of the strap 44 are pivoted at 45 to links 46 which are pivoted at 47 to the lower ends of vertical arms 48. The arms 48 are pivotally mounted on cross arms 49 which are carried by supports 50 which are carried by the underside of platform 10. See Figs. 1 and 14. At their upper ends, the arms 48 carry jaws 51 and 52. The jaw 51 is made of metal and is heated by a resistor or the like 52x which is energized by a wire 53 leading to the main switch S. The jaw 52 is also made of metal but is of a U-shaped cross section so as to accommodate a resilient insert 54 made of rubber or the like to provide a cushioned abutment for jaw 51. By the arrangement described, as the link 42 moves up and down in response to the rocking of link 38, the arms 48 rock about cross arms 49 to move jaws 51 and 52 toward or away from each other.

Constantly riding on cam 28 is follower roller 58 which is connected by pin 59 to link 60 at a point intermediate the ends of said link. The inner, or right hand, end of link 60, as viewed in Fig. 12, is freely rotatable about the stub shaft 39 on which link 38 is pivoted, and the other end of link 60 is pivoted at 61 to the upper end of a link 62 the lower end of which is pivoted at 64 to a lug 65 carried by another curved strap 66 at a point intermediate the ends of said strap. The ends of strap 66 are pivoted at 67 to links 68 which are pivoted at 69 to the lower ends of vertical arms 70. The vertical arms 70 are also pivotally mounted on the same cross arms 49 on which the arms 48 are mounted. The arms 70 carry jaws 71 which are preferably U-shape in cross section and which are provided with resilient inserts or the like 72. Each of the jaws is recessed as at 74 so as to permit the resilient insert 72 to yield for a purpose hereinafter set forth. The inserts 72 are made of very soft rubber or other highly compressible material. The motion of the arms 70 is the same as that of arms 48 and will be more fully explained in recapitulating the operation of the machine. All of the jaws are preferably cushioned by means of springs 79.

A follower roller 80 constantly rides on cam 32 and is connected, by pin 81 to lever 82 at a point intermediate the ends of said link. The inner, or right hand, end of link 82, as viewed in Fig. 12, is pivoted at 83 to a bracket 84 carried by platform 10. The other end of lever 82 is provided with a transverse arm or cross head 86 which underlies an arm 88 which carries a flat suction nozzle 90 adapted to be inserted into a bag B to be evacuated. The inner, or right hand, end of arm 88 is pivoted at 92 to a bracket 93. Therefore, as follower roller 80 rides over the high and low portions of cam 32, the lever 82 rocks about its pivot point 83 and, when it moves in clockwise direction as viewed in Fig. 1, the cross head 86 engages the underside of arm 88 and raises it from the position of Fig. 12 to the position of Fig. 1. The arm 88 is retained in its upper position by a spring loaded pin 94 carried by bracket 96 and disposed in the path of movement of arm 88. Thus, and as best shown in Fig. 11, as the arm 88 is raised to its upper position, it passes pin 94 which is thus pushed into socket 94x of bracket 96 against the pressure of a spring 95 which urges the pin outwardly or to the left in Fig. 11. As soon as the arm 88 has cleared the pin 94, the latter is pushed out by the spring and prevents the arm 88 from moving down by its own weight, but does not prevent it being pulled down by the operator.

The brackets 93 and 96 are carried by a frame or support 97 which also carries a table 98 which is shown in Figs. 1 and 2 and which is omitted from Fig. 12. The frame 97 is provided with hubs 99 which are best shown in Figs. 1 and 14 and which slidably engage stub shafts 100 whereby the table 98, the arm 88 and the nozzle 90 may be moved to the solid or broken lines positions of Fig. 14 for a purpose hereinafter set forth.

As shown in Fig. 8, the cam 32 also has associated with it a pair of follower rollers 102 and 103 carried by arms 104 and 105 which are pivoted at 106 to a bracket 107 carried by the platform 10. The rollers 102 and 103 are tensioned against cam 32 by a spring 108 connecting the arms 104 and 105. When roller 102 rides on a high portion of cam 32, the arm 104 is raised so as to contact and actuate the spring loaded push button 110 of a micro-switch 111 also carried by lug 107. The circuit of the micro-switch 111 is normally open and is adapted to be closed only when the button 110 is pushed upwardly by arm 104. This switch 111 is connected by wire 112 to a suction pump 113. The intake end of the suction pump is connected by tube 114 to receptacle 116 which is also connected by tube 118 to suction nozzle 90 on arm 88.

The suction pump is provided with a conventional pressure controlling device 120 which may be set by knob 122 so as to predetermine the degree of vacuum to be produced by the pump. The pressure control device is operatively connected to, and is adapted to actuate, a solenoid 124 whenever the degree of vacuum in bag B reaches the predetermined limit to which the pressure control device 120 has been set. The purpose of the solenoid and the manner in which it operates will be hereinafter set forth.

A second micro-switch 130 is mounted near the inner end of arm 88 and has a spring loaded push button 132. The circuit of the micro-switch 130 is normally open but, when arm 88 is moved to its lower position as shown in Fig. 12, the push button 132 is moved upwardly by contact pressure against adjacent portion of support 97 and the circuit is closed. When the arm 88 is raised to the position of Fig. 1 the push button 132 moves outwardly to open the circuit. The micro-switch 130 is connected by a wire 136 to the suction pump motor, to close the circuit of the motor when the arm 88 moves to its lower position and to open the circuit and stop operation of the pump when the arm 88 moves to its upper position.

The cams 26, 28 and 32 are integrated with the clutch 23 by means of a pin 140 adapted to engage any one of a number of openings 142 in the clutch. The pin 140 is carried by the cam assembly and is urged toward clutch 23 by a spring 143. The pin 140 has a tapered groove 144 adapted to be engaged by a correspondingly tapered portion 146 of a knife-like member 148. The member 148 is urged upwardly, or towards spacer disc 30 by a spring 149 and may be pulled downwardly, or away from disc 30, by means of rod 150 connected to a foot pedal not shown. A similar knife-like member 151 is pivoted as at 152 to lug 153 carried by the platform 10, and is urged to the right, or towards spacer disc 30, by a spring 154. The member 151 also has a tapered portion exactly like tapered portion 146 on member 148. The action of the knife-like members 148 and 151 is such that when either of them is interposed in the path of the pin 140, as it rotates with the cam assembly about the axis of shaft 21, the tapered portion 146 of the knife-like members will successively engage the groove 144 in the pin 140. By this arrangement, when the inclined wall of the groove 144 in the pin 140 rides on the inclined wall of tapered portion 146 of the member 148 or 151, the pin is moved to the right, as viewed in Fig. 4, or out of engagement with the clutch 23 thus disconnecting the cam assembly from the clutch to stop rotation of the cam assembly. The friction between the inner face of the knife-like member 148 or 151 against spacer disc 30, and the friction between rollers 102 and 103 against cam 32 serve to stop the rotation of the cam assembly immediately upon disengagement from the clutch. It will be understood that the gear 20 and clutch 23 continue to rotate as long as switch S is in its "on" position.

The operation of the apparatus thus far described is as follows: The main switch S is moved to "on" position to energize the heater 52x of jaw 51 and the motor 14 which drives the gear 20 and clutch 23. The operator now pulls the table 98 and the arm 88 carrying the suction nozzle 90, in the direction of the arrow in Fig. 2, or out of registration with the jaws 52, 53 and 71. A bag B containing material to be packed, such as sauerkraut and brine is then placed on the table 98 and the table is then pushed back to its position below the jaws and arm 88 is depressed so as to cause the suction nozzle 90 to enter the bag.

In the parts are in the position of Fig. 5, the tapered wall of the groove 144 of pin 140 will ride on the tapered wall 146 of knife-like member 148 and therefore the pin 140 will be withdrawn from the corresponding opening 142 in clutch 23 to disconnect the cam assembly from the clutch. By pulling down on rod 150, by means of a foot pedal or otherwise, the knife-like member 148 is pulled down, against the action of spring 149 to disengage it from pin 140. The spring 143 now pushes the pin 140 into the corresponding opening 142 in clutch 23 to cause the cam assembly to rotate with the clutch. Movement of roller 58 over an appropriately shaped portion of cam 28 rocks link 60 and actuates links 62 and 68 to cause jaws 71 to move to the closed position of Fig. 12. In this position the jaws 71 are clamped against the mouth of the bag and against the flat suction nozzle 90 which is inserted in the bag. In this connection it will be noted that the recessed portions 74 of the jaws 71 permit rubber inserts of the jaws to yield so as to accommodate the flat nozzle 90. By this arrangement the jaws 71 can be closed tightly against the nozzle 90 without crushing it. Simultaneously, the movement of roller 102 over cam 32 moves link 104 upwardly, as viewed in Fig. 8, so as to move push button 110 into circuit closing position to energize suction pump 113 which proceeds to evacuate the bag B. In order that the brine from bag B may not enter the pump, the tube 118 leads from suction nozzle 90 to a tank 116 which, in turn, is connected to the suction pump by tube 114. In this way any brine sucked off with the air from bag B will be deposited in the tank 116 to be emptied from time to time.

It will be noted by comparing Figs. 5 and 6 that by the time the cam assembly has moved through an angle of about 90 degrees to cause the jaws 71 to close and to energise the suction pump, the other knife-like member 151 engages the pin 140 and withdraws it from engagement with clutch 23 again to disengage the cam assembly from the clutch. The disengagement of the pin 140 from the clutch by either of the knife-like members 148 or 151, coupled with the frictional engagement of one or both of the members 148 or 151 with spacer disc 30, serves immediately to stop the rotation of the cam assembly.

When the vaccum in bag B has reached the value to which the pressure control 120 has been set, the solenoid 124 is energized and pulls on connecting rod 166 to disengage member 151 from pin 140 thus again causing the cam assembly to rotate with the clutch.

Movement of roller 80 over cam 32 causes lever 82 to move in clockwise direction, as viewed in Fig. 2, whereby the cross head 86 engages the underside of arm 88 and raises the latter to the position of Fig. 1 in which the suction nozzle 90 is out of the bag. It will be understood that as the suction nozzle is withdrawn from the bag, the resilient cushions of the jaws 71 will follow the movement of the nozzle 90, progressively upwardly, and will thus prevent entry of air into the bag during, or as a result of, the withdrawal of the suction nozzle 90 from the bag. The movement of arm 88 upwardly allows the push button to move outwardly or to a position in which it breaks the circuit of the suction pump.

The movement of roller 34 over cam 26 rocks link 38 which actuates link 42 to actuate links 46 and arms 48 to close the jaws 51 and 52 against the mouth of the bag at a point above the jaws 71. The heat from jaw 51 and the pressure of the jaws 51 and 52 serve to seal the mouth of the bag. The parts may now be said to have reached the position shown in Fig. 7 and the movements of the rollers 34 and 58 over the remaining portions of the cams 26 and 28 are operative to move the jaws 51, 52 and 71 back to their respective positions as shown in Fig. 1, the arrangement being such that the sealing jaws 51 and 52 move to their open position just before the jaws 71 move to their open position. By the time this has been done, the parts will again be in the position shown in Fig. 1 in which they are ready for the beginning of a new cycle of operation.

If desired the reciprocable table 98 may be replaced by an endless conveyor for supporting and moving the bags or other receptacles to be evacuated and sealed. As shown in Figs. 12 and 13, I use an endless sprocket chain 170 which travels over driven and idle sprockets 172 and which carries cup shaped members 174 each of which has a bottom 176 hinged at 178. The cups 174 ride endlessly over a non-continuous rail 180 the ends of which are spaced apart a distance slightly greater than the length of the bottom wall 176 of a cup 174. The space between the ends of rail 180 can be seen to the right of arrow 181 in Fig. 13 and is so located that, after the sealing operation has been completed, and after both sets of jaws have moved to their open position, the cups 174 will successively move off the upper end of rail 180 as viewed in Fig. 13 and will move, in the direction of arrow 181, toward the lower end of rail 180. As each cup 174 traverses the space between the ends of the rail 180, its hinged unsupported bottom wall 176 will swing to the position of Fig. 13A and will allow the evacuated and sealed bag to drop onto a table or other conveyor not shown. The movement of the sprocket chain will be intermittent so as to provide an interval of time for the bag evacuating operation. Since this can be done by means of a multilated gear or any other well known means it is not deemed necessary to illustrate or describe any particular expedient for carrying out this step.

Except for substituting an endless conveyor for the table 98, the structure of the embodiment of Fig. 12 is identical with that of Fig. 1.

What I claim is:

1. A machine for removing air from receptacles made of thermoplastic material and for heat-sealing the mouths of said receptacles, said machine including hingedly connected supports for said receptacles, a first cam, a second cam and a third cam, means for intermittently rotating each of said cams through a predetermined arc, a first roller adapted to ride on said first cam, a suction pump, a motor driving said suction pump, a suction nozzle connected to said suction pump and movable to a lower position, in which said nozzle enters the mouth of a receptacle, and to an upper position, in which said nozzle is spaced from the mouth of said receptacle, a normally open pair of holding jaws, a first system of linkage operatively connected to said first roller and to said holding jaws and operable by engagement of said first roller with a predetermined portion of said first cam to close said holding jaws against the mouth of said receptacle, a second roller adapted to ride on said second cam, an arm operatively connected to said roller and movable by engagement of said second roller with a first predetermined portion of said second cam to energize said motor, means responsive to the degree of vacuum in said receptacle for rotating said second cam to disengage said second roller from said first predetermined portion of said second cam to de-energize said motor, a third roller adapted to ride on said second cam, a lever operatively connected to said third roller and operable, by engagement of said third roller with a second predetermined portion of said second cam to raise said suction nozzle to its upper position, a normally open pair of sealing jaws, means for heating at least one of said sealing jaws, a fourth roller adapted to ride on said third cam, and a second linkage system operatively connected to said fourth roller and to said sealing jaws and operable by engagement of said fourth roller with a predetermined portion of said third cam, to close said sealing jaws against the mouth of said receptacle.

2. The structure recited in claim 1 in which said rollers, said linkage systems and the predetermined portions of said first and third cams are so related that the holding jaws are clamped against the mouth of said receptacle ahead of said sealing jaws.

3. The structure recited in claim 1 in which the sealing jaws are located above the holding jaws and engage the receptacle at a point nearer to the mouth of the receptacle than the point at which the holding jaws engage the receptacle.

4. The structure recited in claim 1 in which the predetermined portions of the first and third cams are so shaped and related that said fourth roller is disengaged from the predetermined portion of the third cam before the first roller is disengaged from the predetermined portion of the first cam whereby the sealing jaws are disengaged from the receptacle ahead of the holding jaws.

5. The structure recited in claim 1 in which the second predetermined portion on said second cam and the predetermined portion on said third cam are so shaped and related that the third roller operates to raise said suction nozzle before said fourth roller and said second linkage operate to close said sealing jaws.

6. The structure recited in claim 1 in which said cams are arranged with their respective effective portions out of registration with each other and in which said cams are driven simultaneously as a unit.

7. The structure recited in claim 1 in which each of said supports includes a vertical wall and a bottom wall hinged at one end thereof to said vertical wall, a non-continuous rail forming rail sections and means for propelling said supports with said hinged bottom walls riding on said rail sections, the ends of said rail sections being spaced apart a distance greater than the length of said hinged bottom wall whereby, as each of said supports moves over the space between the ends of said rail sections, the hinged bottom of each of said supports drops by gravity and discharges the evacuated and sealed receptacle carried by such support.

JOSEPH MARZIANI.

REFERENCES CITED

The following references are of record in the file of this patent:

UNITED STATES PATENTS

| Number | Name | Date |
| --- | --- | --- |
| 707,544 | Bates | Aug. 26, 1902 |
| 862,231 | Bates | Aug. 6, 1907 |
| 1,688,499 | Jones | Oct. 23, 1928 |
| 2,145,941 | Maxfield | Feb. 7, 1939 |
| 2,281,187 | Waters | Apr. 28, 1942 |
| 2,410,834 | Messmer | Nov. 12, 1946 |
| 2,491,226 | St. Jacques et al. | Dec. 13, 1949 |